(12) United States Patent
Delince et al.

(10) Patent No.: US 7,436,646 B2
(45) Date of Patent: Oct. 14, 2008

(54) PROTECTION ELEMENT FOR A CAPACITOR WITH SELF-HEALING PROPERTIES

(75) Inventors: Francois Delince, Biesme (BE); Luc Spronck, Soumagne (BE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 11/523,804

(22) Filed: Sep. 20, 2006

(65) Prior Publication Data

US 2007/0097594 A1    May 3, 2007

(30) Foreign Application Priority Data

Sep. 20, 2005    (EP) .................................. 05108682

(51) Int. Cl.
*H01G 2/14*        (2006.01)
(52) U.S. Cl. .................................... 361/273; 361/275.2
(58) Field of Classification Search ......... 361/272–273, 361/275.1, 275.2, 275.3, 275.4
See application file for complete search history.

(56) References Cited

U.S. PATENT DOCUMENTS 5,148,347 A * 9/1992 Cox et al. .................... 361/272
5,381,301 A * 1/1995 Hudis ....................... 361/275.2

FOREIGN PATENT DOCUMENTS

| DE | 10 44 947 B | 11/1958 |
|----|-------------|---------|
| DE | 17 64 858 A1 | 8/1971 |
| DE | 26 06 176 A1 | 8/1977 |
| DE | 31 38 271 A1 | 4/1983 |
| DE | 296 24 248 U1 | 7/2001 |
| FR | 1 214 833 A | 4/1960 |
| JP | 08 088142 A | 4/1996 |
| WO | WO 87/07780 A | 12/1987 |

* cited by examiner

*Primary Examiner*—Eric Thomas
(74) *Attorney, Agent, or Firm*—Jacobson Holman PLLC

(57) ABSTRACT

A protection element for a capacitor with self-healing properties has a membrane for activating a current interruption element when a gas, produced when a self-healing operation occurs within the capacitor, exerts a pressure on the membrane, the current interruption element being connected in series with an electrode of the capacitor, the current interruption element interrupting an electrical current flowing towards the electrode when the pressure is exerted on the membrane, and the current interruption element being operationally engaged with a temperature sensitive member that reacts, when sensing a temperature above a predetermined value, in a manner to operate the current interruption element.

12 Claims, 3 Drawing Sheets

PROTECTION ELEMENT FOR A CAPACITOR WITH SELF-HEALING PROPERTIES

The present invention relates to a protection element for a capacitor with self-healing properties, said protection element having a membrane and being provided for activating, upon a pressure exerted on said membrane, by a gas produced upon a self-healing operation occurred within said capacitor, a current interruption element to be connected in series with an electrode of said capacitor, said current interruption element being provided for interrupting an electrical current flowing towards said electrode when said pressure is exerted on said membrane, said current interruption element being operationally engaged with a temperature sensitive member provided to react when sensing a temperature increase above a predetermined value.

Such a protection element is known from DE-B-1044947. The known protection element protects the capacitor against overpressure and also acts as a thermal protection. In the known protection element the current interruption element comprises a wire extending between a spring and the membrane. When the pressure raises, the gas present in the housing of the protection element will exert a pressure on the membrane, thereby causing the latter to bulge. Since the wire is soldered to the membrane, the wire will follow the movement of the membrane. In case of overpressure, the force applied by the bulged membrane on the wire will be so high that the wire will break, thereby interrupting the current flowing through the wire. The thermal protection is realised by using a solder for the connection between the membrane and the wire, which solder will start to melt if the temperature has raised above the predetermined value. The melt of the solder will cause the wire to disconnect from the membrane thereby also interrupting the current flow through the wire.

Such a protection element is also known from EPS 0931324. The protection element described in the latter patent protects the self-healing capacitor against too high currents, which could occur during a self-healing operation. When a self-healing operation occurs in the capacitor, the current flowing through the failed spot in the capacitor could become high, which could on its turn lead to an evaporation of the electrode material and the formation of a gaseous plasma. The thus created gas forms then an overpressure leading to a bulge of the membrane. The pressure thus exerted on the membrane will activate the current interruption element, which on its turn will interrupt the current flowing to the electrode, thereby avoiding a further supply of electrical current to the capacitor and consequently the further evaporation of the electrode material.

A problem of the protection element known from DE-B-1044947 is that it does not always work in a reliable manner. As a force is applied on the wire, which is connected to a spring, a strong force is required to overcome the elasticity of the wire and the spring, before the wire can be broken. As the wire is soldered to the membrane, care has to be taken to adequately solder the wire to the membrane. Indeed if the wire is not adequately soldered to the membrane the force applied on the wire by the membrane could cause a rupture of the soldering at a too early stage. Furthermore as a melt of the soldering is required to let the protection element operate as a thermal protection, care has to be taken that the wire is indeed disconnected from the membrane when the soldering melts and that it does not stick on the melt solder.

The object of the invention is to realise a protection element for a capacitor with self-healing properties, which protects the capacitor against a too high temperature and an overpressure in a reliable manner.

For this purpose, a protection element according to the present invention is characterised in that said membrane is provided to exert a pressure on said current interruption element in order to activate the latter, said temperature sensitive members being provided for applying a pressure on said current interruption element when sensing said temperature increase above said predetermined value, in such a manner as to operate said current interruption element. According to the present invention the current interruption element always acts by exerting a pressure, independently whether it acts as a protection against overpressure or as a thermal protection. Thus in both configurations the current interruption element is submitted to a same movement, thereby offering a reliable protection element.

A first preferred embodiment of a protection element according to the invention is characterised in that said temperature sensitive member comprises a spring made of a shape memory alloy, said spring being calibrated at said predetermined temperature value. The use of a spring made of a shape memory alloy enables a precise temperature calibration and thus a reliable operation of the protection element. It should be noted that the use of a shape memory alloy for a spring as part of an electronic component is known from JP-A-08 088142. However in the latter patent application the current has to flow through the spring in order to operate the spring. In the present embodiment no current is flowing through the spring.

A second preferred embodiment of a protection element according to the invention is characterised in that said membrane and said temperature sensitive member are made of a shape memory alloy and form a single component. The membrane has thus a double function leading to a reduction of components.

A third preferred embodiment of a protection element according to the invention is characterised in that said temperature sensitive member comprises a wax actuator, calibrated at said predetermined temperature value. Once the predetermined temperature has been reached, the melted wax will occupy a larger volume than the solid wax, thereby operating the current interruption element.

A fourth preferred embodiment of a protection element according to the invention is characterised in that said temperature sensitive member comprises a spring, embedded in a material, having a melting point corresponding to said predetermined temperature value. Once the material has melt, the embedded spring will be liberated and activate the current interruption element.

A fifth preferred embodiment of a protection element according to the invention is characterised in that said current interruption element comprises an electrical conductor facing a cutting member provided to cut said conductor. The use of a cutting member enables a reliable and easy realisation of the current interruption element.

The invention will now be described in more details with reference to the annexed drawings illustrating preferred embodiments of a protection element for a self-healing capacitor. In the drawings:

Figure 1:
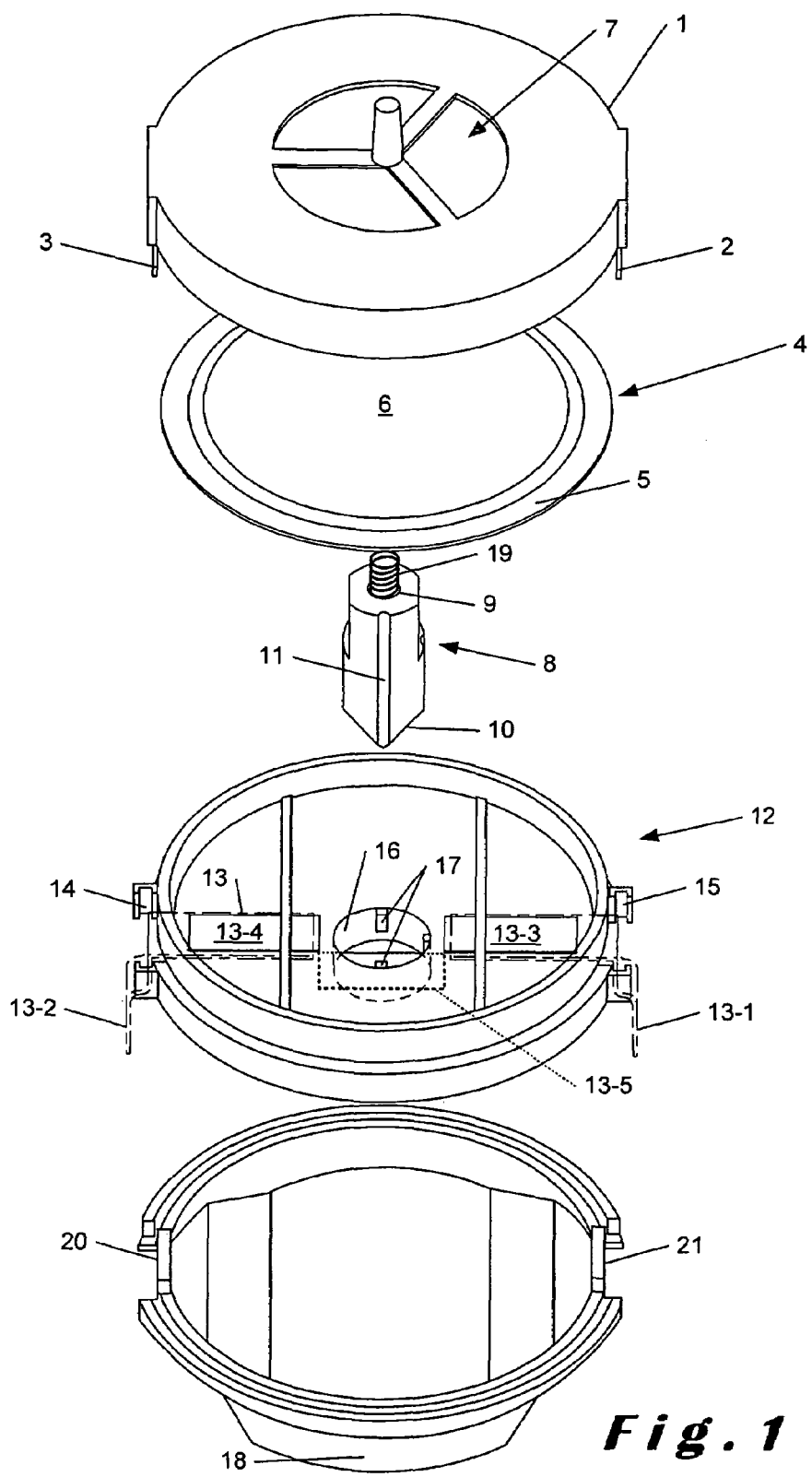
FIG. 1 shows an exploded view of a protection element according to the present invention.

In the drawings a same reference sign has been allocated to a same or analogous element.

The protection element according to the present invention and shown in FIG. 1, comprises a housing having an upper lid 1, provided with an opening 7. On the peripheral edge of the upper lid 1 flaps 2 and 3 are provided on opposite sides, which flaps extend in downward direction and beyond the peripheral edge.

A membrane 4, made of flexible material, is dimensioned in such a manner as to fit inside the volume of the upper lid 1. For this purpose the diameter of the membrane corresponds substantially to the inner diameter of the upper lid. Moreover, the correspondence between those diameters avoids that gas would enter inside the housing of the protection element thereby disturbing its operation. Preferably, the membrane has an inner part 6 surrounded by a border 5, which is thinner than the inner part. In mounted state of the protection element, the membrane faces the opening 7 so that a pressure can be applied on said membrane by a gas reaching said opening 7.

Figure 4:
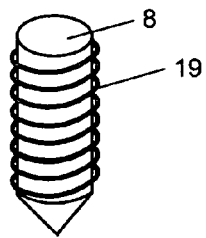
FIG. 4 shows an example of a cutting member around which a spring is wrapped.

The protection element further comprises a movably mounted element 8, which is part of a current interruption element. The element 8 is preferably substantially cylindrically shaped and provided with a knife shaped extremity (10), for example formed by two inclined end faces having a common edge. Guiding grooves 11 are preferably applied on the outer lateral sides of the element 8. According to a preferred embodiment, the element 8 comprises a cavity 9 extending inside said element as from an upper face. The cavity is provided for lodging therein a temperature sensitive member 19 such as for example a spring, a bimetal or a wax actuator. Alternatively, the temperature sensitive member could be wrapped around the element 8 when formed by a spring, as illustrated in FIG. 4. In the latter case there is no need for the element 8 to have guiding grooves 1 1and a cavity 9.

The protection element also comprises an electrical contact carrier part 12 provided with guiding protrusions 14 and 15 on its peripheral. The guiding protrusions co-operate with the flaps 2 and 3 of the upper lid, in such a manner that they can be engaged into the guiding protrusions, thereby fixing the upper lid on the contact carrier part. Preferably, the guiding protrusions extend on lateral sides of an electrical conductor 13. The latter comprises two lateral wings 13-1 and 13-2 extending on opposite sides of the contact carrier part. The electrical conductor 13 further comprises a central part, extending between the lateral wings. The central part is formed by two horizontal wings 13-3 and 13-4 extending on both sides of an U-shaped part 13-5. The central part and the lateral wings form together a continuous electrical conductor, preferably made of copper, so that an electrical current applied on one of the lateral wings can flow via the central part to the other lateral wing.

The U-shaped part 13-5 of the electrical conductor extends along an opening 16 crossing said electrical contact carrier part 12 in a vertical direction. In the opening 16 there are provided further guiding protrusions 17, which co-operate with the guiding grooves 11 of the element 8 in such a manner as to guide a movement of said element 8 into said opening 16 and to avoid a rotation of the element 8 into the opening. As the bottom of the U-shaped part 13-5 of the conductor 13 crosses the opening 16, the bottom of the U-shaped part forms as if to say the bottom of the opening 16. Moreover, as in the mounted configuration, the element 8 is lodged inside the opening 16, the knife shaped extremity 10 of the element 8 faces the bottom of the U-shaped part 13-5 of the conductor. In such a manner, when a pressure is applied on the element 8, the knife shaped extremity 10 can cut the conductor 13, thereby acting as current interruption element.

Of course other embodiments then a knife shaped extremity 10 could be provided as cutting member. So, for example the element 8 could be made of glass provided with a sharp extremity 10. Instead of using a cutting member and cut the conductor 13, it could also be possible to use a switch instead of an U-shaped part and have the switch operated by the element 8.

The electrical contact carrier part 12 is closed by a cover lid 18 having protrusions 20 and 21 fitting in said contact carrier part. In such a manner, the cover lid covers the conductor part 13 extending inside the contact carrier part 12.

Several embodiments are possible for realising the temperature sensitive member 19. It is however important that the current interruption element 8 is operationally engaged with the temperature sensitive member 19. In such a manner, the element 8 can be operated by the membrane 4 as well as by the temperature sensitive member. Indeed, if a gas, for example formed inside the capacitor, following a self-healing operation, exerts a pressure on the membrane, this pressure will be exerted on the movable element 8. The pressure applied on the element 8 by the membrane 4, will move the element towards the conductor 13, thereby interrupting the current flowing through the conductor. If the temperature inside the capacitor increases, the temperature sensitive member 19 will react in applying a pressure on element 8, which will lead to the same effect as if the pressure was applied by the membrane 4.

Figure 2:
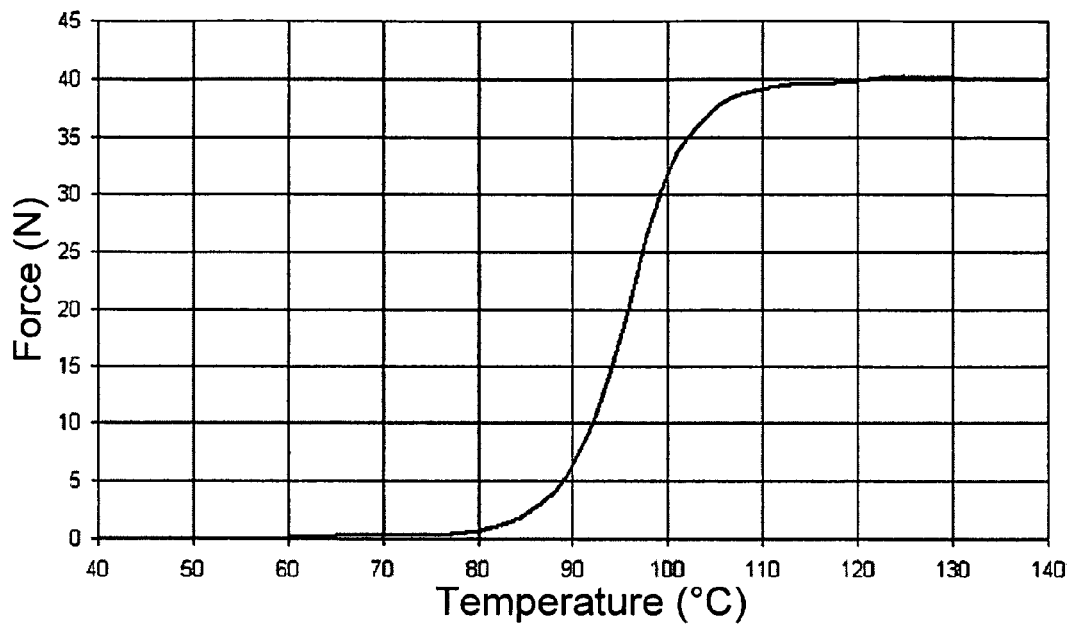
FIG. 2 illustrates an example of the relationship between the force (F) applied by a shape memory alloy spring and the temperature (T)
Figure 3:
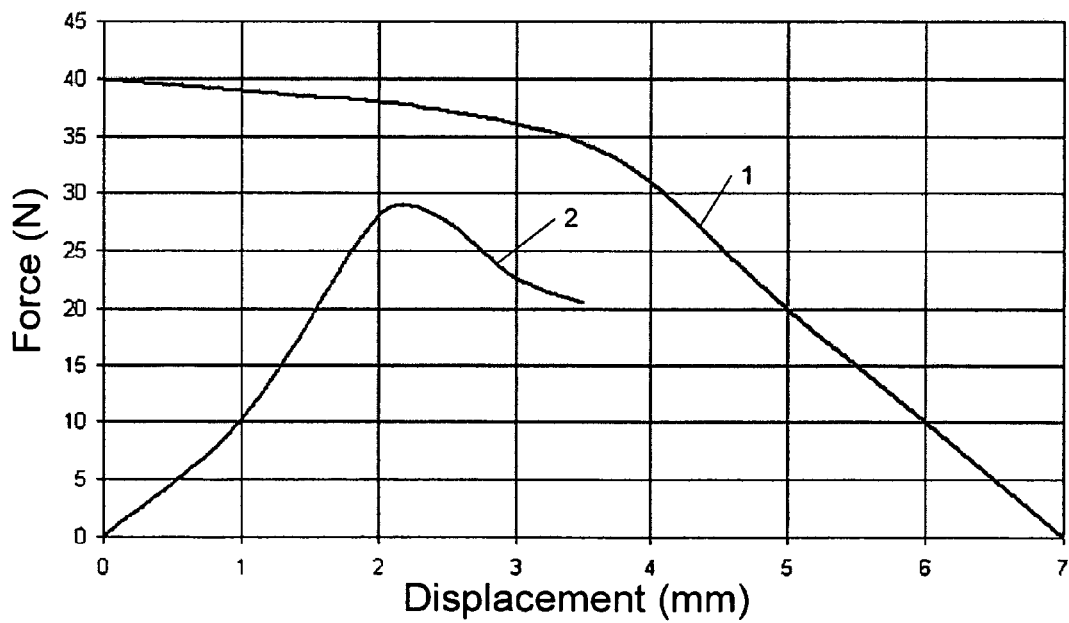
FIG. 3 illustrates by curve 1 an example of the relationship between the force (F) applied by a shape memory alloy spring and its extension and by curve 2 an example of the reaction characteristic of a copper conductor when a force is applied on it.

According to a preferred embodiment, the temperature sensitive member 19 comprises a spring made of a shape memory alloy. Alternatively, the membrane 4 and the temperature sensitive member 19 could form a single element made of a shape memory alloy. The use of shape memory alloy has the property that it takes a well-defined shape and applies a well-defined force when heated to a given or predetermined temperature. FIG. 2 illustrates an example of the relationship between the force (F) applied by a shape memory alloy spring and the temperature (T). As illustrated in this FIG. 2, below a temperature of 80° C. the spring exerts nearly no force. In the range between 80° and 110° C., called the critical range, the force rapidly increases and thereafter remains stable at a temperature of more than 110° C. The value (in Newton) of the applied force will of course also be dependent of the mechanical parameters of the spring such as the thickness of each winding, the numbers of windings, etc. . . FIG. 3 illustrates an example of the relationship between the force (F) applied by a shape memory alloy spring and its extension (curve 1). As illustrated in this FIG. 3, once the value of 40 Newton has been reached an extension of the spring will lead to a reduction of the exerted force. Thus once the predetermined temperature at which the member 19 has to react has been established, an appropriate member capable to react on this predetermined temperature will be selected.

If the temperature sensitive member 19 is now formed by such a shape memory alloy spring placed in the cavity 9 or wrapped around the element 8, as shown in FIG. 2, the spring will exert no force if the temperature remains beneath the predetermined temperature (see FIG. 2). So if the ambient temperature remains at normal operational conditions and if no or nearly no heat is produced inside the capacitor, the spring will remain passive and exert no force on the element 8. Once the temperature in or around the capacitor increases and reaches the critical range, the spring will leave its passive state and start to exert a force on the element 8. The spring, or membrane if the latter combines both functions, will now be chosen so that when the predetermined temperature has been reached, the latter is in its operational temperature range and able to exert its full force. The pressure applied on the element 8 will then be such as to activate element 8 and thus interrupt the current flowing through conductor 13. Therefore it is necessary to select an element 19, which is capable of exerting sufficient force on the element 8 in order to be able to cut the conductor 13. Since, as illustrated in FIG. 3, the exerted force decreases by increased length of the spring, care has to be taken that the spring, even after having been extended, can still exert sufficient force in order to cut the conductor.

In FIG. 3, curve 2 shows an example of the reaction characteristic of a copper conductor when a force is applied on it. As illustrated the copper conductor needs a displacement of somewhat more than 2 mm before rupture. Consequently the spring or membrane will have to displace the conductor over a distance of somewhat more than 2 mm before a current interruption can occur. In view of the diminishing force of the spring or membrane (curve 1) care has to be taken that even after having been extended over the latter distance, still sufficient force can be applied to realise a physical rupture of the conductor.

If the membrane 4 is made of such a shape memory alloy, the increase of temperature will cause the membrane to bulge and thus also exert the necessary pressure on the element 8. The use of shape memory alloy enables to choose a membrane applying the required pressure on the element 8 when the predetermined temperature has been reached in order to activate the current interruption element.

Figure 5:
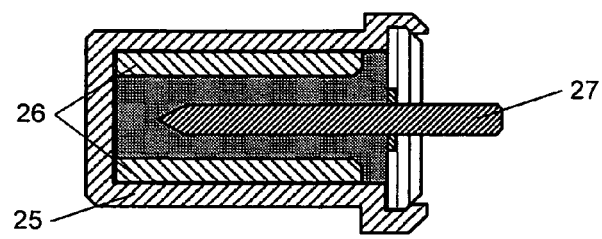
FIGS. 5 and 6 show an example of a wax actuator before, respectively after actuation.
Figure 6:
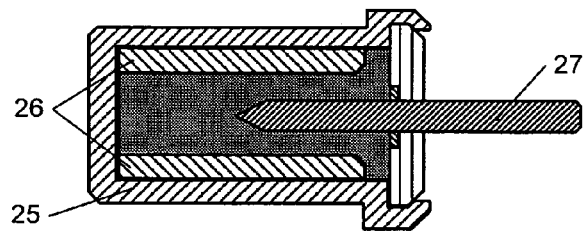
Figure 7:
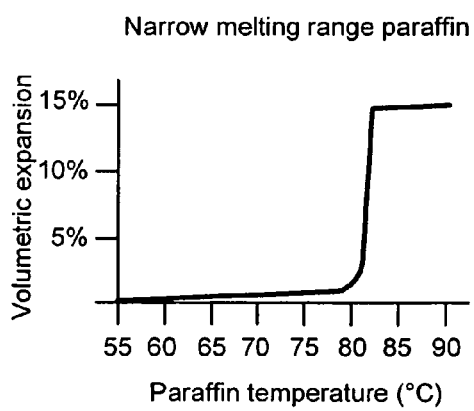
FIGS. 7 and 8 illustrate the paraffin expansion versus temperature for a wax actuator.
Figure 8:
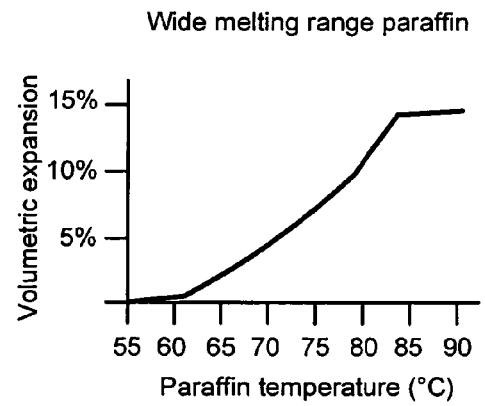

According to another alternative, the temperature sensitive member comprises a wax actuator, calibrated at the predetermined temperature. FIG. 5 illustrates such a wax actuator at ambient temperature, whereas FIG. 6 illustrates the same wax actuator at said predetermined temperature. The wax actuator comprises an enclosure 25 filled with a wax 26, such as for example paraffin ($CH_3$—$(CH_2)n$-$CH_3$ with n=18, . . . 50). An actuator rod 27 is put into said wax. The actuator is mounted on element 8, in such a manner that the rod 27 enters into the cavity 9. When the temperature rises the wax will start to melt, thereby increasing its volume. This volume increase will push the rod so as to move outside the enclosure 25. The rod, which is in the cavity 9, will then exert a pressure on the element. The stroke of the rod is dimensioned in such a manner that when the predetermined temperature has been reached, the rod exerts the necessary pressure on the element 8 to activate the current interruption element The wax could be adapted to present a melting temperature situated between 30° and 140° C. The melting curve could either show a sharp slope, such as illustrated in FIG. 7, or a smooth slope, such as illustrated in FIG. 8. Both FIGS. 5 and 6 show the paraffin temperature versus its volumetric expansion.

Alternatively, the element 8 could be formed by a cylindrical chamber filled with wax and closed by a piston. When the temperature reaches its predetermined valued, the wax will have expanded and will push on the piston so as to move the latter towards the knife.

Further embodiments could be formed by a spring embedded in a material, such as plastic, having a lower melting point than the material of which element 8 is made. When the material has melt due to a temperature increase, the spring will be liberated and act on the element 8.

It could also be possible to have the temperature sensitive member and the membrane form together an inflatable membrane filled with a temperature sensitive fluid. When the temperature increases, the fluid will expand and inflate the membrane, thereby applying a pressure on element 8.

As other alternative, the temperature sensitive member could comprise a bimetal or two contact elements connected to each other by means of a weld formed by a material, which melts at the predetermined temperature value. It could also be envisaged to use pyrotechnic gasses as temperature sensitive member.

The invention claimed is:

1. A protection element for a capacitor with self-healing properties, said protection element having a membrane (4) and being provided for activating, upon a pressure exerted on said membrane, by a gas produced upon a self-healing operation occurred within said capacitor, a current interruption element (8) to be connected in series with an electrode of said capacitor, said current interruption element being provided for interrupting an electrical current flowing towards said electrode when said pressure is exerted on said membrane, said current interruption element being operationally engaged with a temperature sensitive member (19) provided to react when sensing a temperature increase above a predetermined value, characterized in that said membrane is provided to exert a pressure on said current interruption element in order to activate the current interruption element, said temperature sensitive member being provided for applying a pressure on said current interruption element when sensing said temperature increase above said predetermined value in such a manner as to operate said current interruption element.

2. The protection element as claimed in claim 1, characterized in that said temperature sensitive member comprises a spring made of a shape memory alloy, said spring being calibrated at said predetermined temperature value.

3. The protection element as claimed in claim 2, characterized in that said spring is wrapped around said current interruption element.

4. The protection element as claimed in claim 1, characterized in that said membrane and said temperature sensitive member are made of a shape memory alloy and form a single component.

5. The protection element as claimed in claim 1, characterized in that said temperature sensitive member comprises a wax actuator calibrated at said predetermined temperature value.

6. The protection element as claimed in claim 1, characterized in that said temperature sensitive member comprises a spring embedded in a material having a melting point corresponding to said predetermined temperature value.

7. The protection element as claimed in claim 1, characterized in that said temperature sensitive member and said membrane form together an inflatable membrane filled with a temperature sensitive fluid provided to inflate said membrane upon exceeding said predetermined temperature value.

8. The protection element as claimed in claim 1, characterized in that said temperature sensitive member comprises a bimetal calibrated at said predetermined temperature value.

9. The protection element as claimed in claim 1, characterized in that said temperature sensitive member comprises two contact elements connected to each other by means of a weld formed by a material, which melts at said predetermined temperature value.

10. The protection element as claimed claim 1, characterized in that said current interruption element comprises an electrical conductor facing a cutting member provided to cut said conductor.

11. A protection element, for a capacitor with self-healing properties, comprising:
- a) a current interruption element (8), connectable in series with an electrode of the capacitor and for interrupting current, when activated, to the electrode,
- b) a membrane (4), and
- c) a temperature sensitive member (19), the current interruption element being activated by pressure from at least one of the membrane, when pressure is exerted on the membrane by a gas produced by a self healing operation occurring within the capacitor and the temperature sensitive member, when a temperature increase above a predetermined value is detected by the temperature sensitive member.

12. A protection element, for a capacitor with self-healing properties, comprising:
- a) a current interruption element (8), connectable in series with an electrode of the capacitor and for mechanically interrupting current, when activated, to the electrode,
- b) a membrane (4), and
- c) a temperature sensitive member (19), the current interruption element being activated by pressure from at least one of the membrane, when pressure is exerted on the membrane by a gas produced by a self-healing operation occurring within the capacitor and the temperature sensitive member, when a temperature increase above a predetermined value is detected by the temperature sensitive member.

* * * * *